United States Patent [19]

Nachtkamp et al.

[11] 4,172,191

[45] Oct. 23, 1979

[54] PROCESS FOR THE PREPARATION OF POLYISOCYANATES ADDITION PRODUCTS CONTAINING CARBOXYLATE GROUPS

[75] Inventors: Klaus Nachtkamp, Bergisch Gladbach; Dieter Dieterich, Leverkusen; Otto Lorenz, Roetgen-Rott, all of Fed. Rep. of Germany

[73] Assignee: Bayer Aktiengesellschaft, Leverkusen, Fed. Rep. of Germany

[21] Appl. No.: 916,403

[22] Filed: Jun. 16, 1978

[30] Foreign Application Priority Data

Jun. 29, 1977 [DE] Fed. Rep. of Germany ....... 2729245

[51] Int. Cl.$^2$ ............................................ C08G 18/34
[52] U.S. Cl. ............................. 528/61; 260/29.2 TN; 528/65; 528/71; 528/73
[58] Field of Search ...................... 528/71, 73, 61, 65; 260/29.2 TN

[56] References Cited

U.S. PATENT DOCUMENTS

| 3,412,055 | 11/1968 | Koral | 260/22 CA |
|---|---|---|---|
| 3,539,483 | 11/1970 | Keberle et al. | 260/29.3 |
| 3,607,800 | 9/1971 | Sekmakas | 260/29.2 TN |
| 3,860,546 | 1/1975 | Tsou | 260/29.2 TN |
| 3,959,348 | 5/1976 | Reiff et al. | 260/471 C |
| 4,029,617 | 6/1977 | Dhein et al. | 260/20 |

Primary Examiner—Maurice J. Welsh
Attorney, Agent, or Firm—Gene Harsh; Lawrence S. Pope

[57] ABSTRACT

The present disclosure is concerned with a process for the preparation of carboxylate containing polyurethane and the polymers so produced. Hydroxyl bearing components are reacted with tri- or tetra-carboxylic acid monoanhydrides so as to incorporate free carboxyl groups into the component, a proportion of the carboxyl groups are neutralized to ionic salts and hydroxyl component is then reacted with polyisocyanates and simultaneously or subsequently with chain extending agents. The polymer may be obtained as a dispersion in water and the chain lengthening agent may be water, formaldehyde or water soluble amines or hydrazines.

11 Claims, No Drawings

PROCESS FOR THE PREPARATION OF POLYISOCYANATES ADDITION PRODUCTS CONTAINING CARBOXYLATE GROUPS

BACKGROUND OF THE INVENTION

Many processes are known for the preparation of polyurethanes which contain carboxylate groups. For example, these polyurethanes can be prepared by reacting the usual prepolymers which have isocyanate end groups in an organic solvent with aqueous solutions of amino carboxylic acids or their salts to form the corresponding polyurethane ureas containing carboxylate groups as described, for example, in German Auslegeschrift No. 1,495,745, British Pat. No. 1,076,688 and U.S. Pat. No. 3,539,483.

According to another process, dimethylol propionic acid may be used as chain lengthening agent for the synthesis of polyurethanes. The free carboxylic group is then for the most part preserved and can subsequently be neutralized as described for example in U.S. Pat. No. 3,412,055 and German Offenlegungsschrift No. 1,913,271.

According to another known process, polyurethanes which contain free primary or secondary amino groups are reacted with β-propiolactone or the anhydride of a dicarboxylic acid. In this process, the polyurethane is modified with free carboxyl groups as described, for example, in German Auslegeschrift No. 1,237,306.

The use of polyethers or polyesters which have hydroxyl end groups and sulphonate or carboxylate groups in side chains for the synthesis of anionic polyurethane dispersions has also been described, for example in German Auslegeschrift No. 1,570,615. The use of diamines which contain sulphonate or carboxylate groups has been considered for the preparation of polyurethanes which have anionic groups in side chains, for example in German Auslegeschrift No. 1,570,615.

The disadvantages of the known processes is that they can either only be carried out in the presence of organic solvents or require the use of specially synthesized polyesters. Although dimethylol propionic acid can be built into isocyanate prepolymers without the use of solvents, the problem arises in many cases of how to dissolve dimethylol propionic acid in the prepolymer at the required low reaction temperatures. Another disadvantage is that dimethylol propionic acid can only be built in by an isocyanate reaction, with the result that the modified isocyanate prepolymer has a relatively high viscosity.

Esters which contain both hydroxyl groups and free carboxyl groups are already known from the chemistry of dispersible ester resins as described for example in German Offenlegungsschrift No. 2,323,546, U.S. Pat. No. 4,029,617, Belgian Pat. No. 803,346 and U.S. Pat. No. 3,876,582, but the reactive groups are statistically distributed in such products so that these known products cannot be used for synthesizing structurally specific polyurethanes and particularly for synthesizing polyurethanes which are predominantly linear in structure.

SUMMARY OF THE INVENTION

A process has now been found by which polyisocyanate addition products which contain carboxylate groups and, in particular, aqueous dispersions of such addition products can easily be obtained both with and, more importantly, without the use of organic solvents. In particular, the new process makes it possible for low viscosity anionic isocyanate prepolymers to be prepared from optimally low quantities of polyisocyanates so that solvent-free dispersion processes can be carried out particularly easily. The carboxyl component used is readily accessible and inexpensive and the whole manufacturing process can be carried out without any precautionary measures.

The present invention relates to predominantly linear polyisocyanate polyaddition products containing carboxylate and amide groups in structural units of the following formulae:

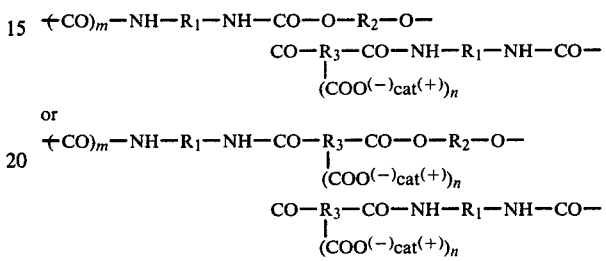

in which
m represents 0 or 1,
n represents 1 or 2,
$R_1$ represents a group which can be obtained by the removal of isocyanate groups from an organic diisocyanate,
$R_2$ represents a group which can be obtained by removal of the hydroxyl groups from a glycol or glycol mixture which may contain ether or ester groups and which has an average molecular weight of between 62 and 10,000,
$R_3$ represents a group obtainable by the removal of carboxyl groups from an organic tricarboxylic or tetracarboxylic acid, and
$cat^{(+)}$ represents an alkali metal cation or a cation derived from a tertiary amine.

The present invention also relates to a process for the preparation of predominantly linear polyisocyanate polyaddition products containing carboxylate and amide groups and which may also contain urethane groups by the reaction of organic polyisocyanates with polyesters which contain carboxylate groups, free carboxyl groups and which may also contain hydroxyl groups and optionally also with other compounds which have isocyanate reactive hydrogen atoms and are at least difunctional in the isocyanate polyaddition reaction, to produce a prepolymer with isocyanate end groups, followed by chain lengthening of this polymer, characterized in that 1. a polyhydroxyl compound which consists either of one or more glycols having an average molecular weight of from about 62 to 10,000 or of an alcohol mixture having an average hydroxyl functionality of from about 1.8–3.0, which mixtures may contain monohydric alcohols with molecular weights of from about 32–5000 and/or dihydric alcohols with molecular weights of from about 62–10,000 and/or higher functional alcohols with molecular weights of about 92–10,000, are reacted with intramolecular tricarboxylic acid monoanhydrides or intramolecular tetracarboxylic acid monoanhydrides to effect ring opening of the anhydride group, the reactants being used in quantities corresponding to from about 0.05–1 anhydride group per hydroxyl group of the polyhydroxyl component, 2. the carboxyl groups of the reaction product obtained from reaction step 1 are partly neutralized with an inorganic or organic base so that the reaction mixture contains a statistical average of from about 0.1-4 mol of carboxylate groups and a total of about 1.8-3.8 mol of carboxyl and optionally hydroxyl groups per mol of the reaction product, 3. the reaction product obtained from reaction step 2, which contains carboxylate and carboxyl groups and may also contain hydroxyl groups, is reacted with a polyisocyanate component to produce a prepolymer which has isocyanate end groups and contains carboxylate and amide groups and may also contain urethane groups, and 4. the isocyanate prepolymer obtained from reaction step 3 is subjected to a known chain lengthening reaction.

DETAILED DESCRIPTION OF THE INVENTION

The polyhydroxyl component used for the process according to the invention has an average hydroxyl functionality of from about 1.8-3, preferably from about 1.8-2.2. It consists of glycols or glycol mixtures having an average molecular weight of from about 62 to 10,000, preferably from about 200 to 5,000, more particularly from about 300-3,000, or of alcohol mixtures containing monohydric alcohols with molecular weights from about 32 to 5,000, preferably from about 500 to 4,000, and/or glycols within the molecular weight ranges already indicated and/or higher functional alcohols with molecular weights of from about 92 to 10,000, preferably from about 92 to 300.

The glycols are preferably polyester diols or polyether diols.

In addition, there may be used simple alkane diols or polyamides or polyurethanes, polyacetals or polythioethers containing two hydroxyl groups.

The higher functional polyhydroxyl compounds are preferably simple alkane polyols although trifunctional or higher functional polyether polyols or polyester polyols may also be used.

The preferred diols and polyols present in the polyhydroxyl component are therefore compounds of the following series:

1. Alkane diols or polyols such as ethylene glycol, propane-1,2-diol, propane-1,3-diol, tetramethylene glycol, hexamethylene glycol, glycerol, trimethylol ethane, trimethylol propane, pentaerythritol, sorbitol, bisphenol A, ethoxylated or propoxylated bisphenol A, 2,2-bis-(4-hydroxycyclohexyl)-propane or dimethyloltricyclodecane (5,2,1,0$^{2.6}$);

2. Modified polyols, i.e. particularly polyols containing ether or ester groups, or also polyhydroxy polythioethers, polyhydroxy polyacetals, polyhydroxy polycarbonates and/or polyhydroxy polyester amides.

Suitable polyesters with hydroxyl groups include for example reaction products of polyvalent, preferably divalent alcohols, to which trivalent alcohols may be added, and polyvalent, preferably divalent carboxylic acids. Instead of free polycarboxylic acids, the corresponding polycarboxylic acid anhydrides or corresponding polycarboxylic acid esters of lower alcohols or mixtures thereof may, of course, be used for preparing the polyesters. The polycarboxylic acids may be aliphatic, cycloaliphatic, aromatic and/or heterocyclic and they may be substituted, e.g. by halogen atoms, and/or unsaturated. The following are mentioned as examples: Succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid optionally mixed with monomeric fatty acids, dimethyl terephthalate and terephthalic acid-bis-glycol esters. The following are examples of suitable polyvalent alcohols: Ethylene glycol, propylene glycol-(1,2) and -(1,3), butylene glycol-(1,4) and -(2,3), hexanediol-(1,6), octanediol-(1,8), neopentylglycol, cyclohexane dimethanol (1,4-bis-hydroxy-methylcyclohexane), 2-methyl-1,3-propanediol, glycerol, trimethylolpropane, hexanetriol-(1,2,6), butanetriol-(1,2,4), trimethylolethane, pentaerythritol, quinitol, mannitol, and sorbitol, methylglycoside, diethylene glycol, triethylene glycol, tetraethylene glycol, polyethylene glycols, dipropylene glycol, polypropylene glycols, dibutylene glycol and polybutylene glycols. The polyesters may also contain a proportion of carboxyl end groups. Polyesters of lactones such as $\epsilon$-caprolactone or hydroxycarboxylic acids such as $\omega$-hydroxycaproic acid may also be used.

The polyethers used according to the invention which have at least 2 hydroxyl groups are also known per se and are prepared, for example, by polymerization of epoxides such as ethylene oxide, propylene oxide, butylene oxide, tetrahydrofuran, styrene oxide or epichlorohydrin, either on their own, e.g. in the presence of boron trifluoride or by addition of these epoxides, either as mixtures or successively, to starting components having reactive hydrogen atoms, e.g. water or alcohols such as ethylene glycol, propylene glycol-(1,3) or -(1,2), or 4,4'-dihydroxy-diphenylpropane.

Polyethers modified with vinyl polymers, e.g. the compounds obtained by polymerization of styrene or acrylonitrile in the presence of polyethers as described in U.S. Pat. Nos. 3,383,351; 3,304,273; 3,523,093 and 3,110,695, all incorporated herein by reference and German Pat. No. 1,152,536 are also suitable. Higher functional polyethers which may also be added are obtained similarly by the known method of alkoxylation of higher functional starter molecules such as ammonia, ethanolamine, ethylene diamine or sucrose.

Particularly to be mentioned among the polythioethers are the condensation products obtained by reacting thiodiglycol on its own and/or with other glycols, dicarboxylic acids, formaldehyde, aminocarboxylic acids or amino alcohols. The products obtained are polythio mixed ethers, polythio ether esters or polythio ether ester amides, depending on the cocomponents.

Suitable polyacetals include, for example, the compounds which can be prepared from glycols such as diethylene glycol, triethylene glycol, 4,4'-dioxethoxydiphenyl dimethylmethane, hexanediol and formaldehyde. Suitable polyacetals for the purpose of the invention may also be prepared by the polymerization of cyclic acetals.

The polycarbonates with hydroxyl groups used may be of the kind known per se, for example those which can be prepared by the reaction of diols such as propanediol-(1,3), butanediol-(1,4) and/or hexanediol-(1,6), diethylene glycol, triethylene glycol or tetraethylene glycol with diarylcarbonates, e.g. with diphenylcarbonate or phosgene.

Suitable polyester amides and polyamides include, for example, the predominantly linear condensates prepared from polyvalent saturated and unsaturated carboxylic acids or their anhydrides and polyvalent saturated and unsaturated amino alcohols, diamines, polyamines and mixtures thereof.

Polyhydroxyl compounds already containing urethane or urea groups may also be used.

The polyhydroxyl component used according to invention preferably consists exclusively of the glycols mentioned above as examples. In addition, as already explained above, mixtures of such glycols with higher functional polyhydroxyl compounds may be used, provided that the average hydroxyl functionality of the mixtures lies within the range indicated. Monohydric alcohols may also be included in the polyhydroxyl component used according to the invention and the polyhydroxyl compound could conceivably consist solely of a mixture of monohydric and higher than dihydric alcohols, provided that the condition given above concerning the average hydroxyl functionality of the mixture is fulfilled. As a general rule, however, if monohydric or higher than dihydric alcohols are used, one would also use a glycol component in the polyhydroxyl mixture.

Suitable monohydric alcohols include, for example, simple aliphatic, cycloaliphatic and araliphatic monohydric alcohols such as methanol, ethanol, dodecanol, benzyl alcohol or cyclohexanol. However, the inclusion of such simple monohydric alcohols is less advantageous.

It may often be advantageous for the purpose of increasing the hydrophilic character of the prepolymers to add hydrophilic, non-ionic starting components, in particular monohydric or dihydric alcohols which contain ethylene oxide units built into the polyether chain. These hydrophilic starting components may be either dihydroxy polyethers which contain polyethylene oxide segments and have molecular weights within the range indicated above for the glycols or monovalent polyether alcohols which contain ethylene oxide units and have a molecular weight within the range indicated above for the monovalent alcohols. Hydrophilic starting components of this kind have been described, for example, in German Patent Application No. P 26 37 690.9.

Mixtures of the above mentioned polyhydroxyl compounds are frequently used as polyhydroxyl components, for example in order to adapt the hardness, elasticity and handle of the coatings produced from the dispersions to the given practical requirements.

The low molecular weight monovalent, divalent and higher valent alcohols, if used at all, are preferably used in quantities of at the most about 50 hydroxy equivalent %, based on the total quantity of polyhydroxyl component.

When carrying out the process according to the invention, the polyhydroxyl component is reacted with one or more intramolecular tricarboxylic acid monoanhydrides or tetracarboxylic acid monoanhydrides. In this reaction, some or all of the hydroxyl groups of the polyhydroxyl component react with the anhydride in a ring opening addition reaction, i.e. to form ester groups.

The anhydrides may be any intramolecular tricarboxylic or tetracarboxylic acid monoanhydrides which have at least one free carboxyl group. This means that they are generally monoanhydrides of aliphatic, araliphatic or aromatic tricarboxylic or tetracarboxylic acids. Examples of particularly suitable monoanhydrides include trimellitic acid anhydride, meso-1,2,3,4-butane tetracarboxylic acid monoanhydride and 1,2,3,4-cyclopentanetetracarboxylic acid monoanhydride. Also suitable but less preferred are the equimolar reaction products of tetracarboxylic acid dianhydrides with simple monohydric alcohols of the kind already mentioned above as examples, i.e. the ester-anhydride monocarboxylic acids formed in this reaction. The following are examples of tetracarboxylic acid dianhydrides which are suitable for this reaction:

1. Pyromellitic acid dianhydride (1,2,4,5-benzenetetracarboxylic acid dianhydride);
2. Bicyclo-(2,2,2)-octene-(7)-2,3,5,6-tetracarboxylic acid-2,3,5,6-dianhydride;
3. Perylene-3,4,9,10-tetracarboxylic acid dianhydride;
4. Naphthalene tetracarboxylic acid dianhydride;
5. Tetracarboxylic acid anhydrides having the following constitution:

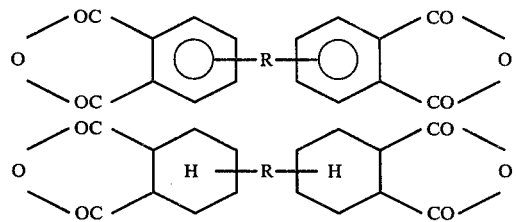

in which R represents a $C_1$-$C_{12}$ alkylene, CO, O, S or $SO_2$-bridge, and the alkylene bridge may also contain heteroatoms, more particularly the alkylene group may be attached to the rings through ester groups. Other carboxylic acid anhydrides which may be used according to the invention or dianhydrides which are suitable precursors for these compounds are mentioned in German Offenlegungsschrift No. 2,443,575, and British Pat. No. 1,473,055, pages 6–7.

Any organic polyisocyanates may be used for the process according to the invention. It is preferred to use diisocyanates represented by the formula $R_1 (NCO)_2$ in which $R_1$ has the meaning already indicated and preferably represents an aliphatic hydrocarbon group with 4 to 12 carbon atoms, a cycloaliphatic hydrocarbon group with 6 to 15 carbon atoms, an aromatic hydrocarbon group with 6 to 15 carbon atoms or an araliphatic hydrocarbon group with 7 to 15 carbon atoms. The following are examples of such preferred diisocyanates: tetramethylene diisocyanate, hexamethylene diisocyanate, dodecamethylene diisocyanate, 1,4-diisocyanatocyclohexane, 1-isocyanato-3,3,5-trimethyl-5-isocyanatomethyl cyclohexane, 4,4'-diisocyanato dicyclohexyl methane, 4,4'-diisocyanato-dicyclohexyl propane-(2,2), 1,4-diisocyanato benzene, 2,4-diisocyanato toluene, 2,6-diisocyanato toluene, 4,4'-diisocyanato diphenyl methane, 4,4'-diisocyanato diphenyl propane-(2,2), p-xylylene-diisocyanate, $\alpha,\alpha,\alpha',\alpha'$-tetramethyl-m- or -p-xylylene diisocyanate, and mixtures of these compounds.

The known higher functional polyisocyanates of polyurethane chemistry and the known modified polyisocyanates, e.g. polyisocyanates with carbodiimide groups, allophanate groups, isocyanurate groups, urethane groups and/or biuret groups may, of course, also be used in the process according to the invention as part or all of the isocyanate component. A certain proportion of monoisocyanates such phenyl isocyanate or dodecyl isocyanate or of partially blocked polyisocyanates could theoretically also be used, but care must always be taken to ensure that the average isocyanate functionality of the polyisocyanate component is between about 1.8 and 3.0.

Any inorganic or organic bases may be used for the partial neutralization of the reaction product obtained from the reaction between polyhydroxyl component and the anhydride which contains carboxyl groups. Preferred neutralizing agents include tertiary amines with molecular weights of from about 59 to 200, e.g. trimethylamine, triethylamine, triisopropylamine, tributylamine, N-methyl pyrrolidine, N-methyl piperidine, dimethyl aminoethanol, dimethylamino propanol, dimethyl aniline, pyridine, 2-methoxyethyl-dimethylamine, 2-(2-dimethylaminoethoxy)ethanol, and 5-diethylamino-2-pentanone. Inorganic bases such as the hydroxides, oxides, carbonates and bicarbonates of the alkali metals are also suitable, particularly sodium hydroxide, potassium hydroxide, lithium hydroxide and potassium carbonate. These inorganic compounds may either be added directly as fine powders or as aqueous or alcoholic solutions. If any isocyanate-reactive solvent such as methanol or water is used, it must subsequently be removed by distillation.

The reactions of the first to third reaction stage may be carried out in the presence of organic solvents, particularly those which are polar such as acetone, methyl ethyl ketone, N-methyl pyrrolidine or methylene chloride. The solvent is generally added as required by the increasing viscosity of the polymer salt. The reactions are preferably carried out at elevated temperatures and without solvents. If the use of solvents is unavoidable because of the viscosity, it is preferred not to use more than about 10%, based on the reaction mixture. The solvents should as far as possible be chosen so that they will also be desirable at subsequent stages, for example for lowering the film-forming temperature or improving the flow or drying properties, etc. For the preferred lacquer dispersions according to the invention, the solvents used are preferably lacquer solvents such as methylisobutyl ketone, glycol-monomethyl ether acetate or glycoldiethyl ether.

For the first stage of the reaction, the reaction of the polyhydroxyl component with the carboxylic anhydride, the reactants are used in proportions such that the reaction mixture contains from about 0.05 to 1, preferably from about 0.1 to 0.5 anhydride groups for each hydroxyl group of the polyhydroxyl component. This reaction is preferably carried out at about 40° to 170° C., most preferably at about 50° to 150° C., and continued until the characteristic anhydride bands at 1780 cm$^{-1}$ and 1860 cm$^{-1}$ have substantially disappeared from the IR spectrum of a sample. In the following reaction step, the carboxyl groups of the modified polyhydroxyl component which in general is present in admixture with unmodified polyhydroxyl component in the reaction product of step 1 are partly neutralized with a base such as those mentioned as examples hereinabove so that 1 mol of the partly neutralized reaction product contains from about 0.1 to 4, preferably about 0.2 to 1 mol of carboxylate groups, at least 0.1 mol of carboxyl groups and a total of about 1.8 to 3.8, preferably about 1.8 to 2.2 mol of carboxyl groups and optionally hydroxyl groups. This partial neutralization is most easily carried out with tertiary amines which are simply added to the reaction mixture in the required quantity. Among the amines with isocyanate reactive groups, it is preferred to use those in which the reactivity of this group is less marked, e.g. amines with secondary or tertiary hydroxyl groups or amide or urethane groups. Inorganic bases are preferably added as aqueous or alcoholic solutions, and the solvent must subsequently be removed by distillation. The partly neutralized reaction product is in general present in admixture with unmodified polyhydroxyl component in accordance with above molar ratios of anhydride groups to hydroxyl groups.

The next reaction stage of the process according to the invention consists of the reaction of the partly neutralized reaction product, which contains carboxylate groups and free carboxyl groups and may also contain hydroxyl groups and which may be in admixture with unmodified polyhydroxy component with the polyisocyanates mentioned as example to produce the corresponding isocyanate prepolymer. In this reaction, the hydroxyl groups give rise to urethane groups while the carboxyl groups give rise to amide groups with elimination of carbon dioxide so that an isocyanate prepolymer which contains amide and carboxylate groups and may also contain urethane groups is obtained. The proportions in which the various components are used in this reaction are chosen so that from about 1.1 to 2, preferably about 1.2 to 2 and most preferably about 1.3 to 1.8 equivalents of isocyanate groups are available for each equivalent of isocyanate reactive groups (carboxyl and optionally hydroxyl groups). It is also possible to use a large excess of polyisocyanate and to remove the excess polyisocyanate after the isocyanate addition reaction, for example by distillation. The reaction is generally carried out at temperatures of from about 40° to 150° C., preferably at about 45° to 130° C. It may be advisable, especially when branched reactants are used for the polyisocyanate component, i.e. compounds which on statistical average have more than two carboxyl and hydroxyl groups, not to continue the isocyanate addition reaction until conversion is complete, i.e. until the reaction products have the predetermined isocyanate content. The reaction may be stopped, for example, at a point when the reaction mixture still contains free carboxyl groups and possibly hydroxyl groups in addition to free isocyanate groups. The reaction may be stopped by, for example, immediately subjecting the incompletely reacted mixture to the chain lengthening reaction according to the fourth reaction stage, for example, by introducing the reaction mixture into an aqueous diamine solution.

When this procedure is adopted, in which not all the carboxyl or hydroxyl groups are reacted with the polyisocyanate component, it is preferred to operate with an equivalent ratio of isocyanate groups to isocyanate reactive groups of between about 0.8:1 and 1.2:1, which means that the polyisocyanate component could conceivably be used in a quantity which corresponds to an equivalent ratio of isocyanate groups to isocyanate reactive groups less than about 1:1 since the isocyanate addition reaction is not carried to completion during formation of the prepolymer and this only partial conversion of the isocyanate groups put into the process ensures that the reaction product will still contain free isocyanate groups even when less than equivalent quantities of the polyisocyanate component are used. In this embodiment of the process according to the invention, excessive increase in the viscosity of the isocyanate prepolymer and premature cross-linking can safely be avoided even when compounds having more than two isocyanate-reactive groups are used.

In a third variation of the process according to the invention, partly blocked polyisocyanates or mixtures of monofunctional, difunctional and/or polyfunctional isocyanates with partly blocked polyisocyanates may be used as polyisocyanate component in the third stage of the process. In this variation of the process, it is also possible to ensure, by suitable choice of the functionality of the compounds which have isocyanate reactive groups and/or the functionality of the polyisocyanate component (based on free isocyanate groups) that, on the one hand, unwanted premature increase in the viscosity or cross-linking will not take place and, on the other hand, intermediate products which have isocyanate end groups as well as blocked isocyanate groups and, in the case of incomplete reaction as mentioned above, also free carboxyl or hydroxyl groups will be obtained. Suitable partially blocked polyisocyanates are in particular the partially blocked polyisocyanates which have a statistical average of about 1.8–2.2 free isocyanate groups per molecule, i.e. for example triisocyanates with one blocked and two unblocked isocyanate groups. Suitable mixtures containing partially blocked polyisocyanates are in particular those which contain either the last mentioned partially blocked polyisocyanates or monoblocked diisocyanates in addition to monofunctional, difunctional and/or polyfunctional polyisocyanates. The individual components of this mixture should be so chosen that the average isocyanate functionality (based on the free isocyanate groups) is between about 1.8 and 2.2. When isocyanate prepolymers prepared according to this invention are used in the fourth reaction step described below, it is possible to obtain high molecular weight polyurethanes which contain blocked isocyanate groups and optionally also carboxyl and/or hydroxyl groups and are therefore systems which are self cross-linked by the action of heat.

Suitable blocking agents include the monofunctional blocking agents used in polyurethane chemistry for organic polyisocyanates, e.g. ε-caprolactam, phenols such as phenol or o-cresol, ketoximes such as methylethyl ketone-ketoxime or C—H-acidic compounds such as diethyl malonate. The preparation of the partially blocked polyisocyanates is carried out by known methods of isocyanate chemistry, using the organic polyisocyanates mentioned above as examples.

The next stage of the process according to the invention consists of converting the isocyanate prepolymers described above into the products of the process according to the invention by a known chain lengthening or cross-linking reaction (in the context of this invention, the term "chain lengthening" is used to mean both a true chain lengthening reaction without branching and a branching or cross-linking of the prepolymer (when using higher than difunctional "chain lengthening agents")). According to a preferred embodiment of the process of the invention, this chain lengthening reaction is combined with concomitant conversion of the products of the process into an aqueous dispersion. The simplest method consists of using water alone as chain lengthening agent. This means that the prepolymer, which has a liquid or honey-like consistency, is stirred up with from about 0.2–10 times its weight of water. Simple laboratory mixers may be used for this purpose although dispersing machines with high shearing forces as well as non-mechanical dispersing means such as ultra high frequency sound waves may, of course, be used. The temperature employed during the mixing process is between about 1° C. and 180° C., preferably between about 20° C. and 100° C. This process may quite well be carried out under pressure if desired.

On the other hand, the chain lengthening reaction may also be carried out with mixtures of water and water soluble chain lengthening agents, preferably those which are more highly reactive with isocyanate groups than water is. If desired, the isocyanate prepolymer may be dispersed in water before the said chain lengthening agent is added. These chain lengthening agents are in particular polyamines or hydrazines with exclusively primary or secondary amino groups, preferably diamines or hydrazines having a molecular weight above about 31, preferably between about 32 and 600. Examples of such hydrazines or polyamines which are suitable as chain lengthening agents include hydrazine, ethylene diamine, diethylene triamine, 1,2-diaminopropane, 1,3-diaminopropane, 3,3,5-trimethyl-5-aminomethyl-cyclohexylamine and 1,4-diaminobutane. Other suitable bifunctional chain lengthening agents have been described in German Offenlegungsschrift No. 1,495,847, Canadian Pat. No. 764,009 and British Pat. No. 1,076,688 and in German Auslegeschrift No. 1,237,306 and U.S. Pat. No. 3,461,103, incorporated herein by reference. In this embodiment of the process according to the invention, water is also used in about 0.2–10 times quantity by weight, based on the isocyanate prepolymer.

In a preferred embodiment of the process according to the invention the chain lengthening reaction is carried out with a mixture of water and polyamines of the kind mentioned above which are in addition modified by chemically fixed ionic groups, preferably chemically fixed sulphonate groups. One such ionically modified chain lengthening agent, for example, is N-(2-aminoethyl)-2-aminoethane sulphonic acid sodium.

The chain lengthening reaction carried out in the fourth reaction stage may also be carried out in the presence of solvents in which the prepolymer is dissolved, although it is one of the major advantages of the process according to the invention that such solvents can be dispensed with. Solvents which may be used for the chain-lengthening reaction are the same as those also suitable for the preparation of the prepolymers.

Chain lengthening of the isocyanate prepolymers obtained by the third stage of the process may also be carried out in accordance with the principles of the process described in U.S. Pat. No. 3,756,992, incorporated herein by reference or in German patent application No. P 26 37 690.9. In that case, prepolymers with urea end groups are first prepared from the isocyanate prepolymer by reacting it with ammonia or primary amines such as methylamine or n-butylamine, and these prepolymers are then lengthened by the reaction with formaldehyde, through the intermediate stage of prepolymers which contain methylol groups, or they are cross-linked with methylol-containing compounds of the kind described in U.S. Pat. No. 3,756,992. The reaction of the isocyanate prepolymers with methylol compounds of the kind mentioned in U.S. Pat. No. 3,756,992 to form prepolymers with methylol end groups without previous conversion of the isocyanate end groups into the corresponding urea groups, followed by heat treatment of the said prepolymers according to U.S. Pat. No. 3,756,992 is also a suitable method of chain lengthening or cross-linking the isocyanate prepolymers obtained in the third stage of the process according to the invention. When chain lengthening is carried out according to this last mentioned variation, synthesis of the high molecular weight polyaddition products and preparation of the intermediate products containing methylol end groups are accompanied by the dispersion of these products in water. Thus, the reaction of the isocyanate prepolymers with ammonia or with the primary amines mentioned as examples to form the corresponding prepolymers containing urea end groups is preferably carried out in an aqueous medium so that the prepolymers with urea groups are obtained in the form of aqueous dispersions or solutions. These prepolymers with urea end groups, which are obtained as dispersions or solutions in water, are then either reacted in the aqueous phase with formaldehyde or with compounds which split off formaldehyde, such as paraformaldehyde, or with compounds which have methylol groups, to form prepolymers with methylol end groups, which prepolymers undergo cross-linking or lengthening at the end groups before and/or during and/or after removal of water, for example by evaporation effected by a heat treatment at about 25° to 180° C. during the process of production of the sheet products from the dispersions. When the isocyanate prepolymers are reacted with methylol compounds without being first converted into prepolymers which have urea groups, this step of the reaction is preferably carried out in the absence of water, whereafter the prepolymer which has methylol groups is dispersed in water and then subjected to further treatment as described above.

Chain lengthening of the isocyanate prepolymers on the principles according to German Offenlegungsschrift No. 2,543,091 is, in principle, also possible.

Isocyanate prepolymers which
(a) have an average isocyanate functionality of from about 1.8 to 2.2, preferably 2,
(b) have a viscosity of about 5000 to 150,000 cP at 80° C.,
(c) contain from about 0.1 to 5% by weight, preferably about 0.2 to 2% by weight of carboxylate groups, and
(d) have an average molecular weight below about 25,000, preferably below about 10,000
are particularly suitable for various chain lengthening reactions.

For the preparation of the isocyanate prepolymers, the nature and quantitative proportions of the starting materials used in reaction steps 1 to 3 according to the invention are therefore preferably chosen so that the isocyanate prepolymers obtained conform to the criteria mentioned above.

Preparation of the aqueous dispersions of the products obtained by the process according to the invention may, of course, also be carried out in the presence of external emulsifiers although it is to be regarded as one of the main advantages of the process according to the invention that such emulsifiers can be dispensed with.

The process according to the invention may, of course, also be carried out in the presence of known catalysts for accelerating the NCO/OH reaction.

Compared with the known solvent process, the new process according to the invention provides a considerable increase in the volume/time yield due to the elimination of the volume of solvent and the elimination of the distillation process which consumes a large amount of energy and time.

When exclusively difunctional starting components are used, as is preferred for the process according to the invention, the preferred products according to the invention represented by the general formulae indicated at the beginning of this description are obtained.

Dispersions prepared by the process according to the invention can be used in a wide variety of fields of application. For example, they can be used for dressing leather or for coating various materials, particularly also for coating textiles, in which case they may be used as adhesive coatings or top coatings. Textile foam coatings can also be produced. Other important fields of application lie in the use of the dispersions as adhesives or as lacquers.

It is particularly advantageous to use the dispersions which have been prepared solvent-free according to the invention as leather dressings or for the production of aqueous lacquer systems.

EXAMPLES 1-8

These Examples illustrate how the process according to the invention is carried out using acetone as auxiliary solvent.

Starting Materials

Polyester I (PE I): Polyester of adipic acid, hexamethylene glycol and 2,2-dimethyl-1,3-propanediol, molecular weight 2,000
Polyether I (PEt I): Polytetramethylene glycol, molecular weight 2,000:
Hexamethylene diisocyanate (HDI);
Trimellitic acid anhydride (TMA);
Ethylene diamine (EDA);
Triethylamine (TEA).

General Method

Crushed TMA was added to dehydrated polyester or polyether at 80° C. with stirring in a three necked flask equipped with ground metal stirrer, reflux condenser with calcium chloride tube, contact thermometer and dropping funnel.

After a reaction time of 2 hours at 120° C., a clear melt had formed, which contained no undissolved TMA. After cooling to 60° C., TEA, followed after 15 minutes by HDI were rapidly added. The mixture was heated to 110° C. and reacted at that temperature for 2 hours. The isocyanate prepolymer was dissolved in acetone and to it was added an acetonic solution of EDA, so that an emulsion was formed. After 5 minutes' stirring at 56° C., deionized water was added with vigorous stirring. The dispersion formed by phase reversal, which occurred after the addition of approx. 40 to 70% of the water. Acetone was distilled off under vacuum until the gaseous phase heated up more vigorously. Table I below shows the experimental conditions and the properties of the dispersions.

Table 1

Experimental conditions and properties of the dispersions and films:

| Example No.: | 1 | 2 | 3 | 4 | 5 | 6 | 7 | 8 |
|---|---|---|---|---|---|---|---|---|
| Starting materials (mol) | | | | | | | | |
| Polyester I | 0.1 | 0.1 | 0.1 | 0.1 | 0.1 | 0.1 | — | — |
| Polyether I | — | — | — | — | — | — | 0.1 | 0.1 |
| TMA | 0.02 | 0.025 | 0.03 | 0.035 | 0.04 | 0.04 | 0.02 | 0.04 |
| TEA | 0.02 | 0.025 | 0.03 | 0.035 | 0.04 | 0.04 | 0.02 | 0.04 |
| HDI | 0.18 | 0.18 | 0.18 | 0.18 | 0.18 | 0.18 | 0.18 | 0.18 |
| EDA | 0.025 | 0.025 | 0.025 | 0.025 | 0.025 | 0.025 | 0.025 | 0.025 |
| Acetone (ml) | 400 | 550 | 550 | 800 | 900 | 400 | 400 | 400 |
| Water (ml) | 355 | 355 | 355 | 355 | 355 | 355 | 355 | 355 |
| Rel. reversal[a] | 0.61 | 0.52 | 0.53 | 0.72 | —[e] | 0.36 | 0.50 | 0.61 |
| Properties of the dispersions: | | | | | | | | |
| solids content (% by weight) | 29 | 37 | 44 | 42 | 36 | 36 | 35 | 38 |
| $\eta_{app}$(m Pa s) at 22° C.[b] | 17 | 16 | 14 | 20 | 20 | 16 | 581 | 18 |
| Stability[c] | | | | | | | | |
| after 2 days | ++ | ++ | ++ | +++ | +++ | +++ | — | +++ |
| after 50 days | — | + | + | ++ | ++ | +++ | | +++ |
| Properties of films: | | | | | | | | |
| Appearance[d] | t | t | t | t | t | t | t,R | t |

[a] Quotient of the volume of water added and the total volume of water at phase reversal
[b] Brookfield viscosimeter, 30 revs per min, measured on the day of preparation of the dispersion
[c] criterion for stability: +++ stable, no sedimentation; ++ slight sedimentation; + severe sedimentation; — coagulation.
[d] t = transparent; R = cracks
[e] formation of dispersion by precipitation.

EXAMPLES 9 TO 39

These Examples illustrate how the process according to the invention is carried out without the aid of an auxiliary solvent and with chain lengthening of the isocyanate prepolymer with water.

Starting Materials

Same as in Examples 1–8 and in addition
Polyether II (PEt II); polypropylene glycol, average molecular weight 1,025.

Excess macroglycol containing hydroxyl end groups is first reacted with TMA for 30 minutes at 100° C. After neutralization of 50% of the calculated quantity of carboxyl groups in the resulting reaction product with TEA, an isocyanate prepolymer is formed by reaction with excess HDI in the melt at 110° C. The reaction time is 120 minutes. When water is added to the isocyanate prepolymer, the excess isocyanate groups react with part of the water in a chain lengthening reaction accompanied by formation of a dispersion.

Table 2

Effect of temperature during formation of the dispersion

Starting materials (mol):
- PEt II: 0.20
- TMA: 0.05
- TEA: 0.05
- HDI: 0.30

| Example No. | 9 | 10 | 11 | 12 | 13 | 14 | 15 |
|---|---|---|---|---|---|---|---|
| Formation of dispersion | | | | | | | |
| Water (g) | 400 | 400 | 400 | 400 | 400 | 400 | 400 |
| Rate of addition of water (g/min) | 36.4 | 36.3 | 36.4 | 33.4 | 36.4 | 38.1 | 36.4 |
| Temp (°C.) | 30±1 | 41±1 | 50±1 | 60±1 | 70±1 | 70±1 | 80±1 |
| $\Delta(NCO)_1$(mol)[a] | 0.428 | 0.414 | 0.430 | 0.413 | 0.430 | 0.424 | 0.439 |
| $\Delta(NCO)_2$(mol)[a] | 0.013 | 0.024 | 0.039 | 0.088 | 0.063 | 0.099 | 0.097 |
| Properties of the dispersions | | | | | | | |
| Solid content (%) | 38.0 | 38.7 | 39.2 | 38.6 | 38.3 | 39.0 | 39.9 |
| $\eta'$(mPa s)[b] | 24 | 39 | 24 | 195 | 598 | 830 | 5700 |
| Stability[c] after 14 days | ++ | ++ | ++ | ++ | +++ | +++ | +++ |
| $d_T$ (μm)[d] | 0.307 | 0.259 | 0.309 | 0.296 | 0.263 | 0.292 | 0.208 |
| Properties of films: | | | | | | | |
| Immediately cast films appearance[e] | t,B | t | t | t | t | t | t,0 |
| $\sigma\ 100^{(N\ mm-2)}$[f] | | 0.176 | 0.227 | 0.265 | 0.339 | 0.328 | |
| $\sigma\ 300^{(N\ mm-2)}$[f] | | 0.268 | 0.400 | 0.386 | 0.438 | 0.460 | |
| Films cast after 14 days Appearance[e] | z.B. | t | t | t | t | t | t,0 |
| $\sigma\ 100^{(N\ mm-2)}$[f] | | 0.152 | 0.142 | 0.197 | 0.231 | 0.361 | |

Table 2-continued

Effect of temperature during formation of the dispersion

| | | | | | |
|---|---|---|---|---|---|
| $\sigma\, 300^{(N\,mm-2)f}$ | 0.262 | 0.218 | 0.290 | 0.317 | 0.508 |

[a] $(NCO)_1$ = isocyanate groups which have been reacted after the first reaction stage (theoretical value: 0.400 mol); $(NCO)_2$ = isocyanate groups which have undergone reaction during dispersion
[b] Brookfield viscosity, 30 revs per min, 20° C., measurement two days after preparation of the dispersion.
[c] Stability: +++ stable, no sedimentation; ++ slight sedimentation; + severe sedimentation; − coagulation after 14 days or earlier
[d] $d_T$ = average particle diameter
[e] Appearance: t = transparent with slight inclusion of bubbles; t,B = transparent with marked inclusion of bubbles; t,0 = transparent with wavy surface; t,k = transparent, slightly tacky; nt = not transparent; k.F. = no film cast [g] Tension at 100% or 300% elongation

Table 3

Effect of temperature during formation of the dispersion

Starting materials (mol):
PEt I 0.10
TMA 0.04
TEA 0.04
HDI 0.16

| Example No. | 16 | 17 | 18 |
|---|---|---|---|
| Formation of dispersion: | | | |
| Water (g) | 355 | 355 | 355 |
| Rate of addition of water (g/min) | 23 | 27 | 27 |
| Temperature (°C.) | 40±1 | 50±1 | 60±1 |
| Δ (NCO)$_1$ (mol) | 0.221 | 0.226 | 0.221 |
| Δ (NCO)$_2$ (mol) | 0.035 | 0.020 | 0.057 |
| Properties of the dispersions: | | | |
| Solid content (%) | 37.4 | 38.6 | 40.2 |
| η' (m Pa s) | 23 | 97 | residues |
| Stability After 14 days | ++ | ++ | not determined |
| dispersed product (%) | 87.0 | 87.7 | not known |
| Properties of the films: | | | |
| Appearance | t | t | k.F. |
| $\sigma 100^{(N\,mm-2)}$ | 0.885 | 0.861 | — |
| $\sigma 300^{(N\,mm-2)}$ | 1.280 | 1.277 | — |

Table 4

Variation in the trimellitic acid anhydride content
Starting materials (mol):

| Example No. | 19 | 20 | 21 | 22 | 23 | 24 | 25 | 26 |
|---|---|---|---|---|---|---|---|---|
| PEt II | 0.20 | 0.20 | 0.20 | 0.20 | 0.20 | 0.20 | 0.20 | 0.20 |
| TMA | 0.02 | 0.03 | 0.04 | 0.05 | 0.06 | 0.07 | 0.08 | 0.08 |
| TEA | 0.02 | 0.03 | 0.04 | 0.05 | 0.06 | 0.07 | 0.08 | 0.08 |
| HDI | 0.30 | 0.30 | 0.30 | 0.30 | 0.30 | 0.30 | 0.30 | 0.30 |
| Formation of the dispersions: | | | | | | | | |
| Water (g) | 385 | 390 | 395 | 400 | 400 | 505 | 410 | 410 |
| Rate of addition of water (g/min) | 31 | 39 | 39 | 36 | 38 | 35 | 34 | 35 |
| Temp (°C.) | 50±1 | 50±1 | 50±1 | 50±1 | 50±1 | 50±1 | 50±1 | 50±1 |
| Δ (NCO)$_1$ (mol) | 0.416 | 0.420 | 0.423 | 0.430 | 0.440 | 0.444 | 0.426 | 0.454 |
| Δ (NCO)$_2$ (mol) | 0.047 | 0.031 | 0.027 | 0.039 | 0.036 | 0.034 | 0.049 | 0.045 |
| Properties of the dispersions: | | | | | | | | |
| Solid Content (%) | 40.0 | 38.5 | 38.8 | 39.2 | 38.7 | 34.3 | 39.4 | 39.4 |
| η'(mPa s) | 20 | 24 | 46 | 24 | 36 | 46 | 95 | 97 |
| Stability after 14 days | — | + | ++ | ++ | ++ | +++ | +++ | +++ |
| $d_T$ (μm) | n.b. | 0.206 | 0.279 | 0.309 | 0.314 | 0.303 | 0.287 | 0.296 |

Table 5

Variation in the trimellitic acid anhydride content:

| Example No. | 27 | 28 | 29 | 30 |
|---|---|---|---|---|
| Starting materials (Mol): | | | | |
| PEt II | 0.10 | 0.10 | 0.10 | 0.10 |
| TMA | 0.03 | 0.05 | 0.06 | 0.07 |
| TEA | 0.03 | 0.05 | 0.06 | 0.07 |
| HDI | 0.15 | 0.15 | 0.15 | 0.15 |
| Formation of the dispersions: | | | | |
| Water (g) | 355 | 355 | 355 | 355 |
| Rate of addition of water (g/min) | 22 | 27 | 12 | 14 |
| Temp. (°C.) | 50±1 | 50±1 | 50±1 | 50±1 |
| Δ(NCO)$_1$(mol) | 0.225 | 0.236 | 0.227 | 0.238 |
| Δ(NCO)$_2$(mol) | 0.012 | 0.020 | 0.045 | 0.019 |
| Properties of the dispersions: | | | | |
| Solid content (%) | 32.5 | 33.7 | 36.8 | 38.3 |
| η'(mPa s) | n.b. | 101 | 64 | 250 |
| Stability after 14 days | — | ++ | +++ | +++ |
| dispersed product(%) | 62.1 | 66.4 | 79.8 | 69.3 |
| Properties of films: | | | | |
| appearance | t | t,k | t,k | t,k |

Table 6

Variation in the isocyanate excess

| Example No. | 31 | 32 | 33 | 34 |
|---|---|---|---|---|
| Starting materials (mol): | | | | |
| PE I (M$_n$ = 2000) | 0.10 | 0.10 | 0.10 | 0.10 |
| TMA | 0.04 | 0.04 | 0.04 | 0.04 |
| TEA | 0.04 | 0.04 | 0.04 | 0.04 |
| HDI | 0.12 | 0.14 | 0.16 | 0.18 |
| Formation of the dispersions: | | | | |
| Water (g) | 355 | 355 | 355 | 505 |
| Rate of addition | | | | |

Table 6-continued

| Variation in the isocyanate excess | | | | |
|---|---|---|---|---|
| Example No. | 31 | 32 | 33 | 34 |
| Starting-materials (mol): | | | | |
| PE I ($M_n$ = 2000) | 0.10 | 0.10 | 0.10 | 0.10 |
| TMA | 0.04 | 0.04 | 0.04 | 0.04 |
| TEA | 0.04 | 0.04 | 0.04 | 0.04 |
| HDI | 0.12 | 0.14 | 0.16 | 0.18 |
| of water (g/min) | 32 | 32 | 23 | 41 |
| Temp. (°C.) | 57±3 | 57±3 | 57±3 | 57±3 |
| Properties of the dispersions: | | | | |
| Solid content (%) | 22.0 | 37.2 | 36.7 | 22.4 |
| $\eta'$(mPa s) | 150 | 84 | 218 | 334 |
| Stability | + | +++ | ++ | + |
| Dispersed product (%) | 42.0 | 89.3 | 86.3 | 60.3 |
| Properties of films: | | | | |
| Appearance | t,k | t | nt,R | nt,R |
| $\sigma 100^{(N\ mm-2)}$ | — | 0.44 | — | — |
| $\sigma 300^{(N\ mm-2)}$ | — | 0.589 | — | — |

Table 7

| Variation in the isocyanate excess | | | | | |
|---|---|---|---|---|---|
| Example No. | 35 | 36 | 37 | 38 | 39 |
| Starting materials (mol) | | | | | |
| PEt II | 0.2 | 0.2 | 0.2 | 0.2 | 0.2 |
| TMA | 0.05 | 0.05 | 0.05 | 0.05 | 0.05 |
| TEA | 0.05 | 0.05 | 0.05 | 0.05 | 0.05 |
| HDI | 0.24 | 0.28 | 0.30 | 0.32 | 0.36 |
| Formation of the dispersions: | | | | | |
| Water (g) | 380 | 390 | 400 | 400 | 410 |
| Rate of addition | | | | | |
| of water (g/min) | 36 | 36 | 36 | 38 | 29 |
| Temp. (°C.) | 50±1 | 50±1 | 50±1 | 50±1 | 50± |
| $\Delta$ (NCO)$_1$(mol) | 0.413 | 0.429 | 0.430 | 0.439 | 0.445 |
| $\Delta$ (NCO)$_2$(mol) | 0.020 | 0.012 | 0.039 | 0.017 | 0.046 |
| Properties of the dispersions: | | | | | |
| Solid content (%) | 37.9 | 38.5 | 39.2 | 39.0 | |
| $\eta'$(mPa s) | 47 | 27 | 24 | 36 | 61 |
| $d_T$(µm) | 0.318 | 0.337 | 0.309 | 0.278 | 0.253 |
| Properties of films: | | | | | |
| Appearance | t,k | t | t | t | t,R |

In the following Examples 40 to 45, the following starting materials were used in addition to those already mentioned:

Polyester II (PE II): Polyester of phthalic acid and ethylene glycol, molecular weight 2000 and hydroxyl number 56;

Polyester III (PE III): Polyester of phthalic acid, adipic acid and ethylene glycol, molecular weight 1750, hydroxyl number 64;

Polyester IV (PE IV): Polyester of adipic acid and butane-1,4-diol, molecular weight 2250 and hydroxyl number 50;

Polyester V (PE V): Polyester of adipic acid, hexamethylene glycol and neopentyl glycol, molecular weight 1700 and hydroxyl number 66;

Polyester III (PEt III): Propoxylated bisphenol A, molecular weight 550;

Polyether IV (PEt IV): Monohydroxypolyether, molecular weight 2150, obtained by alkoxylation of n-butanol. Propoxylation is followed by ethoxylation, and the proportion of propylene oxide is 17% by weight, the proportion of ethylene oxide 83% by weight, based on the total quantity of the alkylene oxides;

Trimethylolpropane (TMP);

Isophorone diisocyanate (IPDI).

EXAMPLE 40

0.3 mol PEt II
0.2 mol PEt III
0.26 mol PE III
0.16 mol TMP
0.6 mol TMA
0.6 mol TEA
1.8 mol HDI
1.6 mol NH$_3$ (NH$_3$/NCO molar ratio=1:1)
3780 g deionized water (corresponding to a solids content of the resulting dispersion of 30% by weight).

TMA is added to the dehydrated mixture of PE II, PE III, PEt III and TMP and the mixture is stirred at 120° to 130° C. until a clear melt is obtained. The mixture is then cooled to 80° C., TEA is added and the mixture is stirred for 15 minutes. HDI is then added and the mixture is stirred at 80° to 90° C. until an isocyanate content of 4.2% is reached. A solution of ammonia in half the water of dispersion is stirred into the resulting prepolymer at 70° to 80° C. and the remainder of the water is added as soon as the product is homogeneous. A colloidal dispersion is obtained in the form of a thin liquid which is stable in storage for more than 2 months. pH—7.7. Outflow time (Ford D$_4$)=17 sec.

A melamine formaldehyde resin of the hexamethoxymethyl melamine series (15% by weight, based on the solid content) is added to a sample of the dispersion, and the dispersion is then stoved on a phosphate-coated metal sheet at 160° C. A clear, colorless, glossy, hard coating is obtained, which is resistant to organic solvents such as xylene, ethyl glycol acetate of acetone and is merely dissolved on the surface by dimethyl formamide. No cloudiness is observed in the film after it has been kept in water for 24 hours.

EXAMPLE 41

Starting Materials 0.2 mol PE II
0.3 mol PE III
0.26 mol PEt III
0.16 mol TMP
0.45 mol TMA (corresponding to 1.3% by weight of COO$^-$ in the dispersed solid)
0.45 mol TEA
1.8 mol HDI
1.4 mol NH$_3$ (NH$_3$/NCO=0.88)
1550 deionized water (corresponding to a 50% by weight dispersion)

Method of preparation: As in Example 40

Dispersion: highly viscous ($\eta$=6,000 cP), white, with pronounced Tyndall effect; no odor of NH$_3$; pH=6.3.

Film: (stoved at 160° C. with 15% of the melamine formaldehyde resin from Example 40): hard, clear, colorless; corresponding to Example 40.

EXAMPLE 42

0.5 mol PE IV
0.5 mol PEt III
0.6 mol TMA
0.6 mol TEA
1.8 mol HDI
1.6 mol NH$_3$
440 g deionized water (corresponding to a 30% dispersion)

Method: as in Example 40

Dispersion: thin liquid, almost colloidal; stable in storage for 1 month;

Film: (stoved at 160° C. with 10% by weight of the melamine-formaldehyde resin from Example 40): colorless, less hard than in Examples 40 and 41.

EXAMPLE 43

1 mol PE V
0.6 mol TMA
0.6 mol TEA
1.8 mol HDI
1.6 mol NH$_3$
5140 g deionized water (corresponding to a 30% by weight concentration)
Process: As in Example 40
Dispersion: thin liquid, almost colloidal, stable in storage;
Film: similar to that of Example 42.

EXAMPLE 44

1 mol PE V
0.6 mol TMA
0.6 mol TEA
1.8 mol IPDI
1.6 mol NH$_3$
5370 g deionized water (corresponding to a 30% dispersion)
Method: as in Example 40
Dispersion: thin liquid, almost colloidal, stable in storage
Film: similar to that of Example 42.

EXAMPLE 45

0.97 mol PE V
0.6 mol PEt IV (corresponding to 4.7% by weight ethylene oxide in solid substance)
0.3 mol TMA (corresponding to 0.6% by weight COO$^-$ in solid substance)
0.3 mol TEA
1.8 mol HDI
1.6 mol NH$_3$
5120 g deionized water (corresponding to a 30% dispersion)
Method: as in Example 40
Dispersion: thin liquid, white with Tyndall effect
Film: similar to that of Example 42.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Predominantly linear polyisocyanate polyaddition products containing carboxylate and amide groups in structural units of the following formulae:

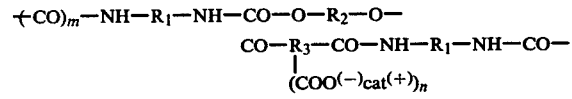

or

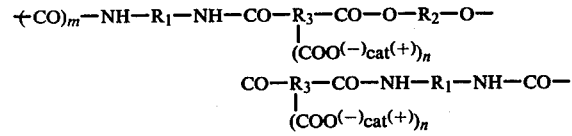

wherein
m represents 0 or 1,
n represents 1 or 2,
R$_1$ represents the residue obtained by removal of the isocyanate groups from an organic diisocyanate,
R$_2$ represents the residue obtained by removal of the hydroxyl groups from a glycol or glycol mixture, which glycol or glycol mixture has a molecular weight or average molecular weight of between about 62 and 10,000 and may contain ether or ester groups,
R$_3$ represents the residue obtained by removal of the carboxyl groups from an organic tricarboxylic or tetracarboxylic acid, and
cat$^{(+)}$ represents an alkali metal cation or a cation derived from a tertiary amine.

2. Polyisocyanate addition products according to claim 1, characterized by containing from about 0.1 to 5% by weight of carboxylate groups.

3. Process for the preparation of predominantly linear polyisocyanate polyaddition products containing carboxylate and amide groups and optionally also urethane groups by the reaction of organic polyisocyanates with polyesters which have carboxylate groups, free carboxyl groups and optionally also hydroxyl groups and optionally also with other compounds which have isocyanate-reactive hydrogen atoms and are at least difunctional in the isocyanate polyaddition reaction to produce a prepolymer with isocyanate end groups, followed by chain lengthening of this prepolymer, characterized in that (1) hydroxyl bearing compounds having a composite average functionality of between about 1.8 and 3.0 selected from the group consisting of (1) glycols having average molecular weights of from about 62 to 10,000 (2) monohydric alcohols with average molecular weights in the range of about 32–5,000, and (3) more than dihydric alcohols with average molecular weights of about 92–10,000 are reacted in such quantities with intramolecular tricarboxylic acid monoanhydrides or intramolecular tetracarboxylic acid monoanhydrides in a ring-opening reaction of the anhydride group that from about 0.05 to 1 anhydride groups are present per hydroxyl group of the polyhydroxyl component;

(2) the carboxyl groups of the reaction product obtained in reaction step (1) are partly neutralized with an inorganic or organic base so that, on statistical average, from about 0.1 to 4 mol of carboxylate groups and a total of from about 1.8 to 3.8 mol of carboxyl groups and optionally hydroxyl groups are present per mol of reaction product;

(3) the reaction product obtained in step (2), which contains carboxylate and carboxyl groups and may also contain hydroxyl groups, is reacted with a polyisocyanate component to form a prepolymer with isocyanate end groups, which prepolymer contains carboxylate and amide groups and may also contain urethane groups, and (4) lastly, the isocyanate prepolymer obtained in reaction step (3) is subjected to a known chain lengthening reaction.

4. Process according to claim 3, characterized in that chain lengthening in reaction step (4) is carried out by reacting the isocyanate prepolymer with water.

5. Process according to claim 3, characterized in that chain lengthening in reaction step (4) is carried out by reacting the isocyanate prepolymer with hydrazines or polyamines which have at least two primary or secondary amino groups.

6. Process according to claim 3, characterized in that chain lengthening in reaction step (4) is carried out by converting the isocyanate prepolymer into a prepolymer having urea end groups by reacting it with ammonia or a primary amine, and this prepolymer with urea end groups is then chain lengthened with formaldehyde or with formaldehyde derivatives.

7. Process according to claims 3 or 4 or 5 or 6 characterized in that the chain lengthening reaction is carried out in the presence of excess quantities of water with simultaneous formation of a dispersion of the polyisocyanate polyaddition product.

8. A process for the preparation of water dispersible linear polyisocyanate polyaddition products comprising
   (a) the preparation of a first component by reacting
      (1) hydroxyl bearing compounds having a composite average functionality of between about 1.8 and 3.0 selected from the group consisting of glycols with average molecular weights of about 62 to 10,000, monohydric alcohols with average molecular weights of about 32 to 5,000, and greater than dihydroxyl alcohols with molecular weights of about 92 to 10,000 with
      (2) intramolecular monoanhydrides of tri- and tetra-carboxylic acids at an anhydride to hydroxyl group ratio of between about 0.05:1 and 1:1 at a temperature of between about 40° and 170° C. so as to incorporate between about 0.1 and 4 mols of carboxyl groups into each mol of reaction product, and
      (3) neutralizing at least about 0.1 mol of carboxyl groups per mol of said reaction product with an organic or inorganic base to form ionic salts,
   said reaction conditions being selected to insure that the total combined hydroxyl and carboxyl functionality of the reaction product is between about 1.8 and 3.8 and to insure that said reaction product has at least 0.1 mol of free carboxyl groups,
   (b) the reaction of said first component with polyisocyanates to yield a polyaddition product which has free isocyanate groups, and
   (c) chain extending said polyaddition product.

9. The process of claim 8 wherein the reaction of said first component with said polyisocyanates is at an isocyanate to hydroxyl group plus carboxyl group ratio of between about 1.1:1 and 2:1.

10. The process of claim 8 wherein the reaction of said first component with said polyisocyanate is at an isocyanate to hydroxyl group plus carboxyl group ratio of between about 0.8:1 and 1.2:1 and wherein before this reaction has gone to completion a chain lengthening compound is combined with the reaction mixture containing at least one of free hydroxyl groups and free carboxyl groups.

11. The process of claims 8 or 9 or 10 wherein the polyisocyanates comprise partially blocked isocyanates with between about 1.8 and 2.2 free isocyanate groups per molecule.

* * * * *